United States Patent
Ro et al.

(10) Patent No.: US 9,800,289 B2
(45) Date of Patent: *Oct. 24, 2017

(54) METHOD AND APPARATUS FOR FREQUENCY ASSIGNMENT IN A FREQUENCY HOPPING MODE OF A WIRELESS COMMUNICATION SYSTEM

(71) Applicant: Samsung Electronics Co., Ltd., Gyeonggi-do (KR)

(72) Inventors: Sang Min Ro, Seoul (KR); Youn H. Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 210 days.

This patent is subject to a terminal disclaimer.

(21) Appl. No.: 14/864,411

(22) Filed: Sep. 24, 2015

(65) Prior Publication Data

US 2016/0013834 A1 Jan. 14, 2016

Related U.S. Application Data

(63) Continuation of application No. 14/570,615, filed on Dec. 15, 2014, now Pat. No. 9,160,401, which is a (Continued)

(30) Foreign Application Priority Data

Dec. 23, 2008 (KR) ........................ 10-2008-0132507

(51) Int. Cl.
*H04L 27/28* (2006.01)
*H04B 1/713* (2011.01)
(Continued)

(52) U.S. Cl.
CPC ........... *H04B 1/713* (2013.01); *H04B 1/7136* (2013.01); *H04B 1/7143* (2013.01); *H04L 1/08* (2013.01); *H04L 5/0053* (2013.01); *H04W 72/04* (2013.01)

(58) Field of Classification Search
CPC .... H04B 1/713; H04B 1/7136; H04B 1/7143; H04W 72/04; H04W 72/042; H04W 48/12
See application file for complete search history.

(56) References Cited

U.S. PATENT DOCUMENTS 7,009,515 B2 * 3/2006 Carrender ............. G01S 13/767
340/10.1
7,844,221 B2 * 11/2010 Forster .................. G01S 13/878
455/41.1
(Continued)

FOREIGN PATENT DOCUMENTS

| CN | 1792054 | 6/2006 |
|---|---|---|
| KR | 1020060081693 | 7/2006 |
| KR | 1020080065528 | 7/2008 |

OTHER PUBLICATIONS

Korean Office Action dated Mar. 31, 2015 issued in counterpart Application No. 10-2008-0132507.

*Primary Examiner* — Sai Aung
(74) *Attorney, Agent, or Firm* — The Farrell Law Firm, P.C.

(57) ABSTRACT

A method and an apparatus are provided for transmitting and receiving uplink data in a wireless communication system. A method includes transmitting first information on hopping, the first information on hopping indicating that one of inter-subframe hopping and intra-subframe hopping is configured; transmitting second information on hopping; determining whether mirroring is applied or not based on a packet transmission number, if the second information on hopping indicates that a predefined hopping pattern is enabled; identifying a resource for receiving the uplink data based on the determination as to whether the mirroring is applied or not; and receiving the uplink data using the identified resource.

12 Claims, 8 Drawing Sheets

Related U.S. Application Data continuation of application No. 14/145,197, filed on Dec. 31, 2013, now Pat. No. 8,929,420, which is a continuation of application No. 13/608,615, filed on Sep. 10, 2012, now Pat. No. 8,619,834, which is a continuation of application No. 12/613,242, filed on Nov. 5, 2009, now Pat. No. 8,265,119.

(51) Int. Cl.
*H04B 1/7143* (2011.01)
*H04B 1/7136* (2011.01)
*H04L 1/08* (2006.01)
*H04L 5/00* (2006.01)
*H04W 72/04* (2009.01)

(56) References Cited

U.S. PATENT DOCUMENTS

| | | |
|---|---|---|
| 8,059,735 B2 | 11/2011 | Shen et al. |
| 8,265,119 B2 | 9/2012 | Ro et al. |
| 8,588,171 B2 | 11/2013 | Fukuoka et al. |
| 8,619,834 B2 | 12/2013 | Ro et al. |
| 8,929,420 B2 | 1/2015 | Ro et al. |
| 2003/0147655 A1* | 8/2003 | Shattil ............... H04L 27/00 398/182 |
| 2004/0268206 A1 | 12/2004 | Kim et al. |
| 2005/0215193 A1* | 9/2005 | Kummetz ......... H04B 7/15585 455/1 |
| 2007/0147526 A1 | 6/2007 | Kim et al. |
| 2007/0195899 A1 | 8/2007 | Bhushan et al. |
| 2008/0089286 A1 | 4/2008 | Malladi et al. |
| 2008/0212532 A1 | 9/2008 | Heo et al. |
| 2008/0212556 A1 | 9/2008 | Heo et al. |
| 2008/0232291 A1 | 9/2008 | Hus et al. |
| 2008/0316957 A1 | 12/2008 | Shen et al. |
| 2010/0284363 A1 | 11/2010 | Ahn et al. |
| 2014/0321405 A1 | 10/2014 | Heo et al. |

* cited by examiner

METHOD AND APPARATUS FOR FREQUENCY ASSIGNMENT IN A FREQUENCY HOPPING MODE OF A WIRELESS COMMUNICATION SYSTEM

PRIORITY

This application is a Continuation of U.S. application Ser. No. 14/570,615, which was filed in the U.S. Patent and Trademark Office on Dec. 15, 2014, which is a Continuation of U.S. application Ser. No. 14/145,197, which was filed in the U.S. Patent and Trademark Office on Dec. 31, 2013, and issued as U.S. Pat. No. 8,929,420 on Jan. 6, 2015, which is a Continuation of U.S. application Ser. No. 13/608,615, which was filed in the U.S. Patent and Trademark Office on Sep. 10, 2012, and issued as U.S. Pat. No. 8,619,834 on Dec. 31, 2013, which is a Continuation of U.S. application Ser. No. 12/613,242, which was filed in the U.S. Patent and Trademark Office on Nov. 5, 2009, and issued as U.S. Pat. No. 8,265,119 on Sep. 11, 2012, and claims priority under 35 U.S.C. §119(a) to Korean Patent Application Serial No. 10-2008-0132507, which was filed in the Korean Intellectual Property Office on Dec. 23, 2008, the content of each of which is incorporated herein by reference.

BACKGROUND OF THE INVENTION

1. Field of the Invention

The present invention relates generally to a frequency allocation method of a wireless communication system operating in a frequency hopping mode and an apparatus therefor and, in particular, to a frequency allocation method and apparatus using a mirroring-assisted frequency hopping pattern for retransmission in a wireless communication system operating in a frequency hopping mode.

2. Description of the Related Art

Universal Mobile Telecommunications System (UMTS) is one of the third generation (3G) mobile telecommunication technologies, which has evolved from Global System for Mobile communications (GSM) and General Packet Radio Services (GPRS) and uses Wideband Code Division Multiple Access (WCDMA).

The $3^{rd}$ Generation Partnership Project (3GPP), which is responsible for standardization of UMTS, is working to significantly extend the performance of UMTS in Long Term Evolution (LTE). LTE is a 3GPP standard that provides for a downlink speed of up to 300 Mbps and is expected to be commercially launched in 2010. In order to fulfill the requirements for the LTE systems, studies have been done on various aspects including minimization of a number of involved nodes in connections and placing radio protocol as close as possible to radio channels.

In current wireless communication systems, a mirroring technique is used for achieving frequency diversity gain to improve reception reliability. As a representative example, LTE uses a mirroring technique for uplink transmission in a frequency hopping mode. Particularly, in a Hybrid Automatic Repeat Request (HARQ) process, the LTE supports an inter-subframe frequency hopping with the mirroring technique for every initial transmission and retransmission to improve the reception reliability of retransmitted data.

In the current standard specification, however, the HARQ retransmission is performed in unit of 8 subframes, while a radio frame includes 10 subframes. This difference in the subframes diminishes further randomization of the frequency hopping even when using the mirroring technique, thereby resulting in a reduction of frequency diversity gain.

SUMMARY OF THE INVENTION

The present invention is designed to address at least the problems and/or disadvantages described above and to provide at least the advantages described below.

Accordingly, an aspect of the present invention is to provide a method for receiving uplink data by a base station in a wireless communication system. The method includes transmitting first information on hopping, the first information on hopping indicating that one of inter-subframe hopping and intra-subframe hopping is configured; transmitting second information on hopping; determining whether mirroring is applied or not based on a packet transmission number, if the second information on hopping indicates that a predefined hopping pattern is enabled; identifying a resource for receiving the uplink data based on the determination as to whether the mirroring is applied or not; and receiving the uplink data using the identified resource.

Another aspect of the present invention is to provide a method for transmitting uplink data by a terminal in a wireless communication system. The method includes receiving first information on hopping indicating, the first information on hopping indicating that one of inter-subframe hopping and intra-subframe hopping is configured; receiving second information on hopping; determining whether mirroring is applied or not based on a packet transmission number, if the information on hopping indicates that a predefined hopping pattern is enabled; identifying a resource for transmitting the uplink data based on the determination as to whether the mirroring is applied or not; and transmitting the uplink data using the identified resource.

Another aspect of the present invention is to provide a base station for receiving uplink data in a wireless communication system. The base station includes a transceiver configured to transmit and receive signals to and from a terminal; and a controller configured to control the transceiver to transmit first information on hopping, the first information on hopping indicating that one of inter-subframe hopping and intra-subframe hopping is configured, to transmit second information on hopping, to determine whether mirroring is applied or not based on a packet transmission number if the information on hopping indicates that a predefined hopping pattern is enabled, to identify a resource for receiving the uplink data based on the determination as to whether the mirroring is applied or not, and to control the transceiver to receive the uplink data using the identified resource.

Another aspect of the present invention is to provide a terminal for transmitting uplink data in a wireless communication system. The terminal includes a transceiver configured to transmit and receive signals to and from a base station; and a controller configured to control the transceiver to receive first information on hopping, the first information on hopping indicating that one of inter-subframe hopping and intra-subframe hopping is configured, to receive second information on hopping, to determine whether mirroring is applied or not based on a packet transmission number if the information on hopping indicates that a predefined hopping pattern is enabled, to identify a resource for transmitting the uplink data based on the determination as to whether the mirroring is applied or not, and to control the transceiver to transmit the uplink data using the identified resource.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Certain embodiments of the present invention will be described in detail below with reference to the accompanying drawings. The same reference numbers are used throughout the drawings to refer to the same or like parts. Detailed descriptions of well-known functions and structures incorporated herein may be omitted to avoid obscuring the subject matter of the present invention.

The terms and words used in the following description and claims are not limited to the bibliographical meanings, but are merely used by the inventor to enable a clear and consistent understanding of the invention. Accordingly, it should be apparent to those skilled in the art that the following description of the embodiments of the present invention are provided for illustration purpose only and not for the purpose of limiting the invention as should be defined by the appended claims and their equivalents.

The terms used in following description are directed to the glossary specified in the 3GPP LTE standard specification. However, the present invention is not limited thereto, but can be applied to various types of wireless communication systems using a mirroring technique in a HARQ process to achieve diversity gain.

Figure 1:
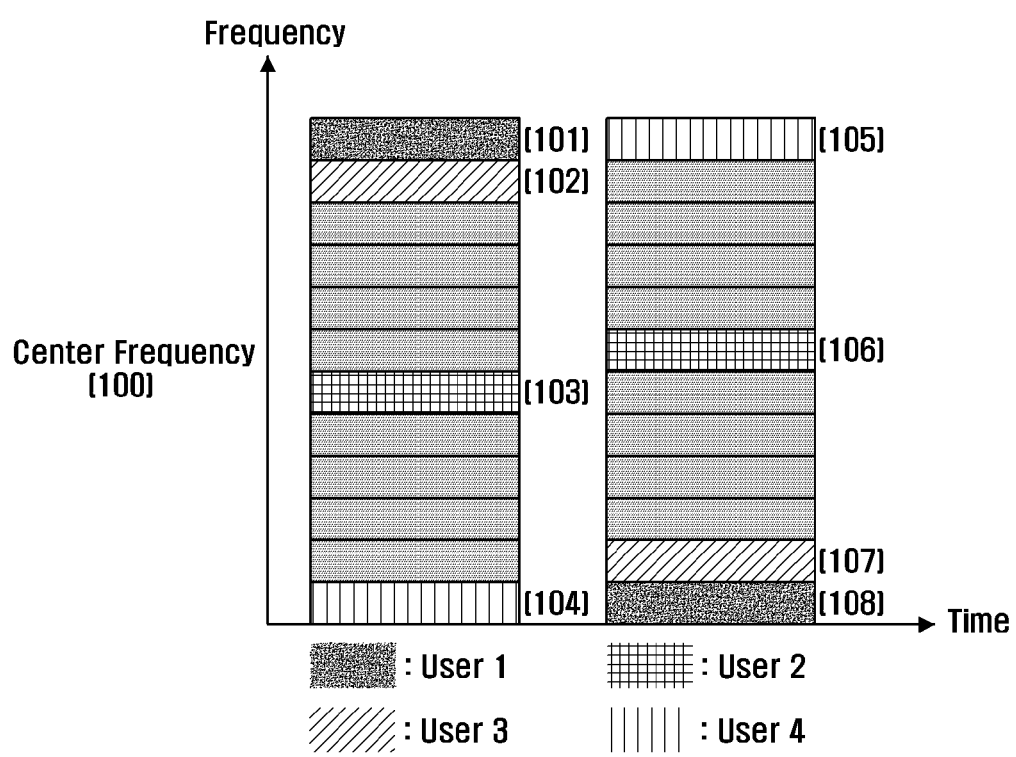
FIG. 1 is a diagram illustrating a principle of frequency hopping using a mirroring technique.

FIG. 1 is a diagram illustrating a principle of frequency hopping using a mirroring technique.

Referring to FIG. 1, four (4) users (user 1, user 2, user 3, and user 4) are allocated frequency resources on a Physical Uplink Shared Channel (PUSCH) and the frequency resources are mirrored to achieve the frequency hopping. User 1 is allocated a frequency resource 101 for an initial transmission and a frequency resource 108 for a next transmission. The frequency resources 101 and 108 are symmetric with each in position from a point of reference of a center frequency 100.

In similar manner, user 2 is allocated frequency resources 102 and 107, user 3 is allocated frequency resources 103 and 106, and user 4 is allocated frequency resources 104 and 105, for their initial and next transmissions. Again, the frequency resources for the initial and next transmissions are symmetric from a reference point of the center frequency 100. The mirroring technique switches the frequency resources symmetrically from the point of reference of the center frequency to achieve the frequency hopping. The transmission data unit can be a frame, a subframe, or a slot depending on the system configuration.

Figure 2:
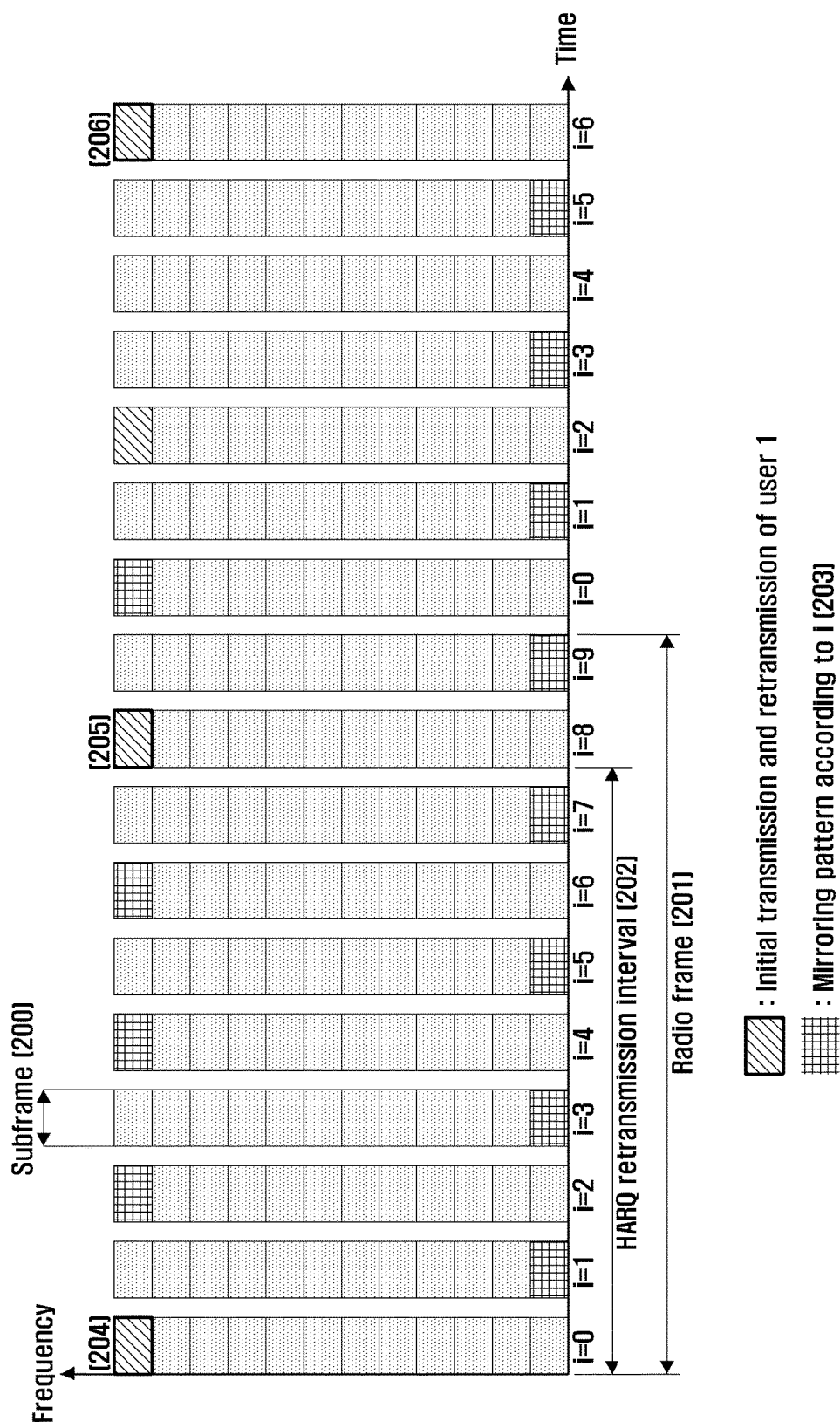
FIG. 2 is a diagram illustrating a principle of a mirroring technique in a HARQ process.

FIG. 2 is a diagram illustrating a principle of a mirroring technique in a HARQ process.

In an LTE system as illustrated in FIG. 2, each user transmits a transmission packet in a unit of a subframe 200, where a radio frame includes 10 subframes. In the specification of the LTE standard, HARQ retransmission is configured to be made in an interval of 8 subframes 202 for an uplink data transmission. Also, the LTE standard specifies a frequency hopping mode adopting the mirroring technique in a unit of a subframe. Mirroring is determined using Equation (1):

$$f_m(i) = i \bmod 2, \quad (1)$$

In Equation (1), i is a subframe index in a radio frame and has a value in the range from 0 to 9, and $f_m(i)$ is a mirroring on/off pattern of an $i^{th}$ subframe. That is, if $f_m(i)$ is 0, the mirroring is off for all the users in frequency hopping transmission mode; and otherwise, if $f_m(i)$ is 1, the mirroring is on. Reference numeral 203 denotes a frequency hopping with mirroring, and the mirroring-added frequency hopping is performed ever two subframes. The mirroring pattern is changed in position from the point of reference of the center frequency.

From the viewpoint of user 2 in FIG. 2, however, the frequency resource allocated for the retransmissions 205 and 206 are identical to that allocated for the initial transmission 204. Accordingly, the users cannot achieve the frequency diversity gains in the HARQ processes through the frequency hopping, even when using the mirroring technique.

Figure 3:
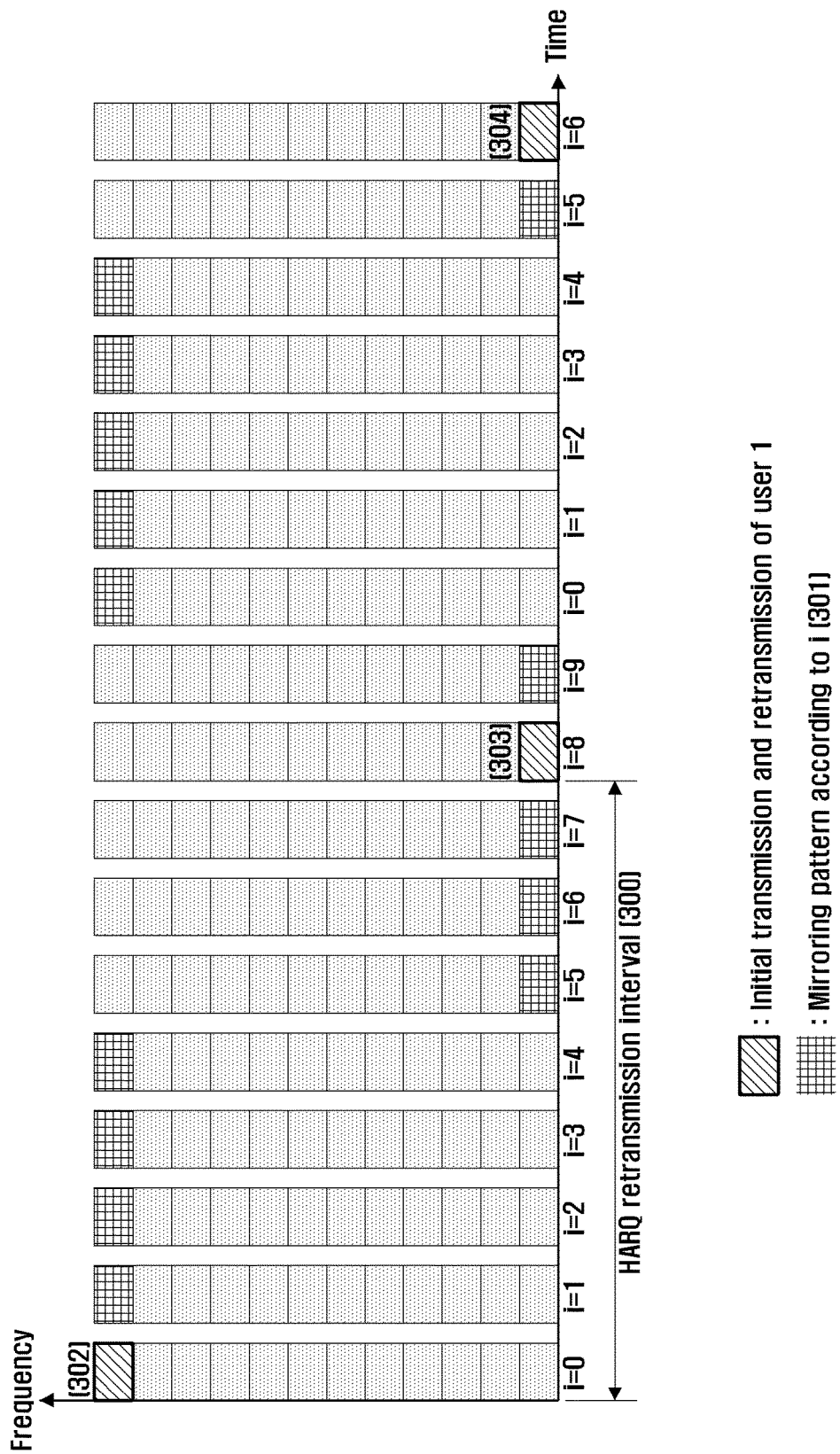
FIG. 3 is a diagram illustrating a principle of a mirroring technique in a HARQ process according to an embodiment of the present invention.

FIG. 3 is a diagram illustrating a principle of a mirroring technique in a HARQ process according to an embodiment of the present invention.

Referring to FIG. 3, it is assumed that a maximum number of transmissions including an initial transmission and HARQ retransmissions is 5, and the mirroring pattern is defined by $f_m(i)$, as shown below in Equation (2). In Equation (2), $f_m(i)$ is a mirroring on/off pattern. Accordingly, if $f_m(i)$ is 0, mirroring is off and, otherwise, if $f_m(i)$ is, mirroring is on.

$$f_m(i) = \lfloor i/5 \rfloor \bmod 2 \quad (2)$$

In Equation (2), $\lfloor i/5 \rfloor$ is a round-down of i/5 ($\lfloor i/5 \rfloor$ is a natural value).

From the mirroring pattern as denoted by reference numeral 301, it is known that the frequency hopping with mirroring occurs in a unit of 5 subframes. Accordingly, user 1 is allocated frequency 302 for an initial transmission and another frequency for first and second retransmissions 304 and 304, respectively, thereby achieving the frequency diversity, and overcoming one of the problems of the prior art.

The mirroring pattern represented by Equation (2) can be generalized by Equation (3):

$$f_m(i) = \lfloor i/G \rfloor \bmod 2 \quad (3)$$

In Equation (3), G denotes a frequency hopping interval with mirroring and is an integer value adjustable in consideration of the length of a radio frame and HARQ retransmission interval, ⌊i/G⌋ enotes a round-down of i/G and is a natural value. Here, G has a value greater than two subframes and equal to or less than the HARQ retransmission.

Figure 4:
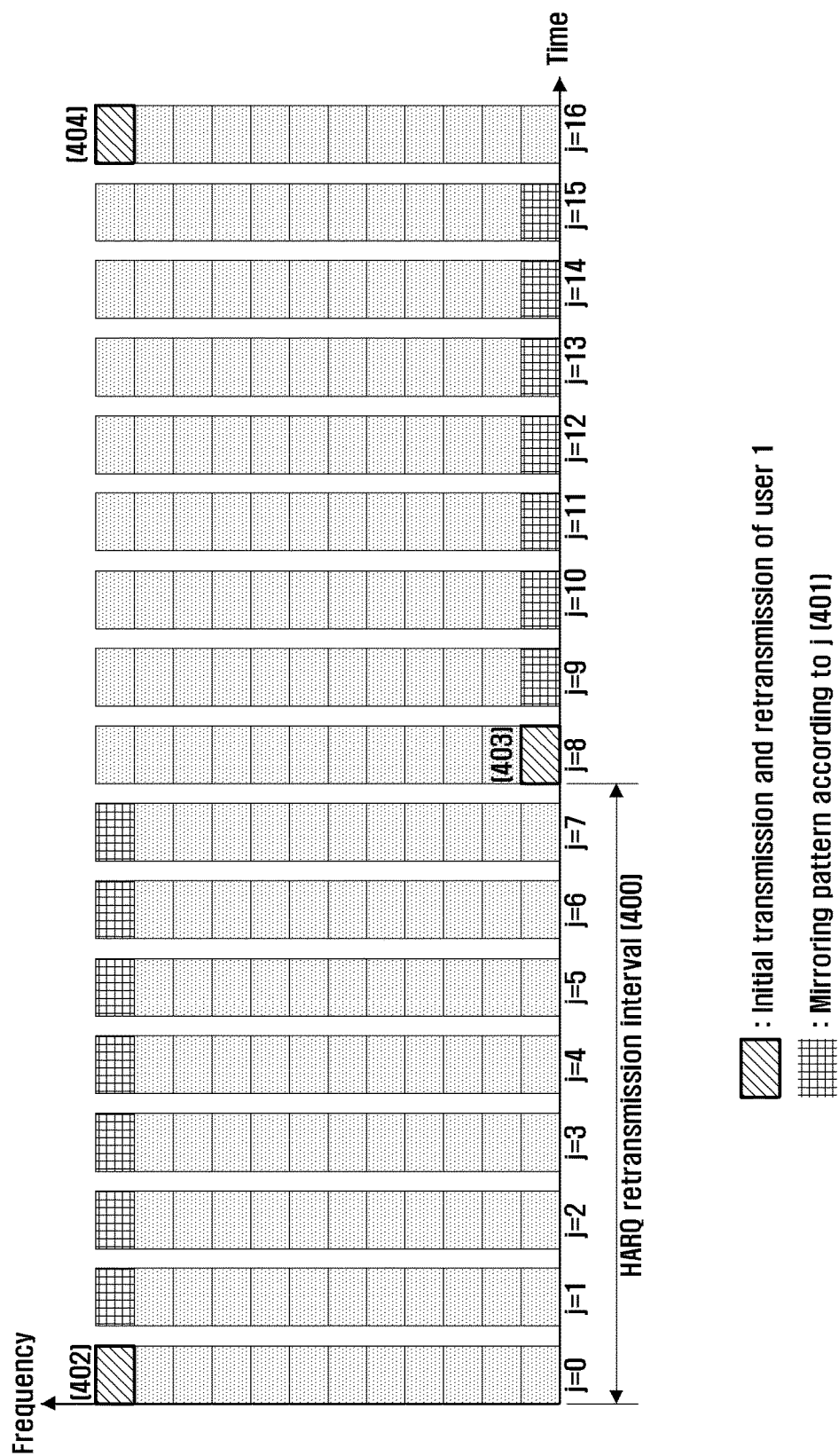
FIG. 4 is a diagram illustrating a principle of a mirroring technique in a HARQ process according to an embodiment of the present invention.

FIG. 4 is a diagram illustrating a principle of a mirroring technique in a HARQ process according to another embodiment of the present invention.

Referring to FIG. 4, a parameter j=10 k+1 indicating the $i^{th}$ subframe index in the $k^{th}$ radio frame is newly defined by extending the definition on the subframe index i in the radio frame. With this new parameter, the mirroring pattern $f_m(i)$ can be written as shown in Equation (4):

$$f_m(j)=\lfloor j/8 \rfloor \bmod 2 (j=10k+i) \quad (4)$$

In Equation (4), ⌊j/8⌋ denotes a round-down value of j/8 (⌊j/8⌋ is a natural value).

In FIG. 4, the frequency hopping interval with mirroring is 8 subframes, such that the mirroring is performed in a unit of 8 subframes that is identical to the HARQ retransmission interval. Accordingly, the initial transmission 402 and first and second HARQ retransmissions 403 and 404 of user 1 are made on the two frequency bands alternately, whereby respective users can achieve the frequency diversity with the mirroring, which is consistent with retransmission timing. The mirroring pattern represented by Equation (4) can be generalized with the HARQ retransmission interval of M subframes as shown in Equation (5)

$$f_m(j)=\lfloor j/M \rfloor \bmod 2 (j=10k+j) \quad (5)$$

In Equation (5), ⌊j/M⌋ mod 2 denotes a round-down value of j/M (⌊j/M⌋ is a natural value).

Figure 5:
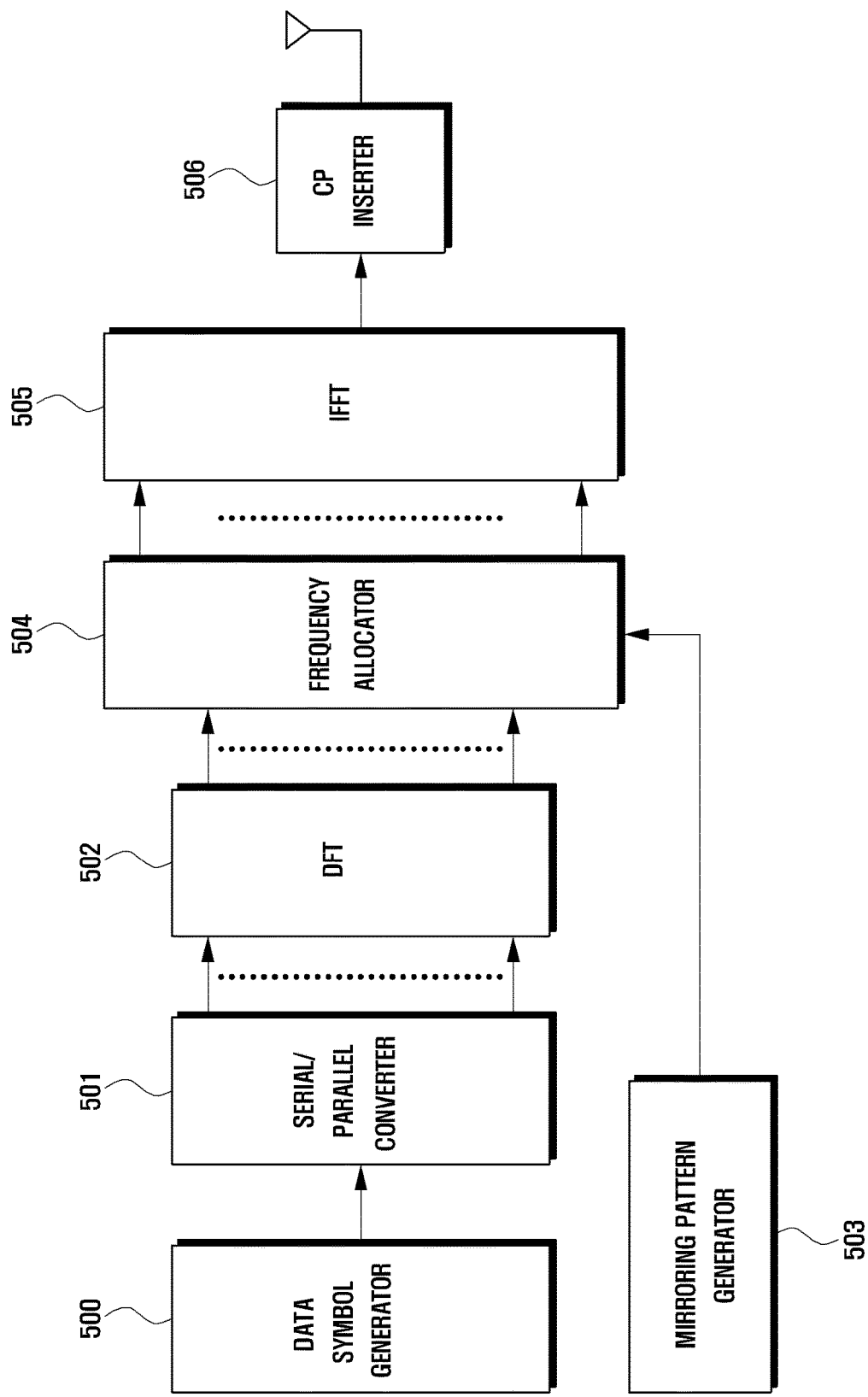
FIG. 5 is a block diagram illustrating a transmission apparatus according to an embodiment of the present invention.

FIG. 5 is a block diagram illustrating a transmission apparatus according to an embodiment of the present invention.

Referring to FIG. 5, the transmission apparatus, e.g., a mobile terminal, includes a data symbol generator 500, a serial/parallel converter 501, a Discrete Fourier Transformer (DFT) 502, a mirroring pattern generator 503, a frequency allocator 504, an Inverse Fast Fourier Transformer (IFFT) 505, and a Cyclic Prefix (CP) inserter 506.

The data symbol generator 500 outputs a data symbol stream to the serial/parallel converter 501, and the serial/parallel converter 501 outputs the data symbols to the DFT 502 in parallel. The DFT 502 transforms the parallel input data symbols in a frequency domain and outputs the transformed signals to the frequency allocator 504.

The frequency allocator 504 allocates frequency bands to the transformed frequency domain representative signals according to a cell-specific mirroring pattern in the entire system bandwidth. The frequency allocator 504 outputs the signals to the IFFT 505, and the IFFT 505 transforms the signals inversely in a time domain and outputs the inversely transformed signal to the CP inserter 506. The CP inserter 506 inserts a CP in to the signal and transmits the CP-inserted signal to a reception apparatus, e.g., a base station.

Figure 6:
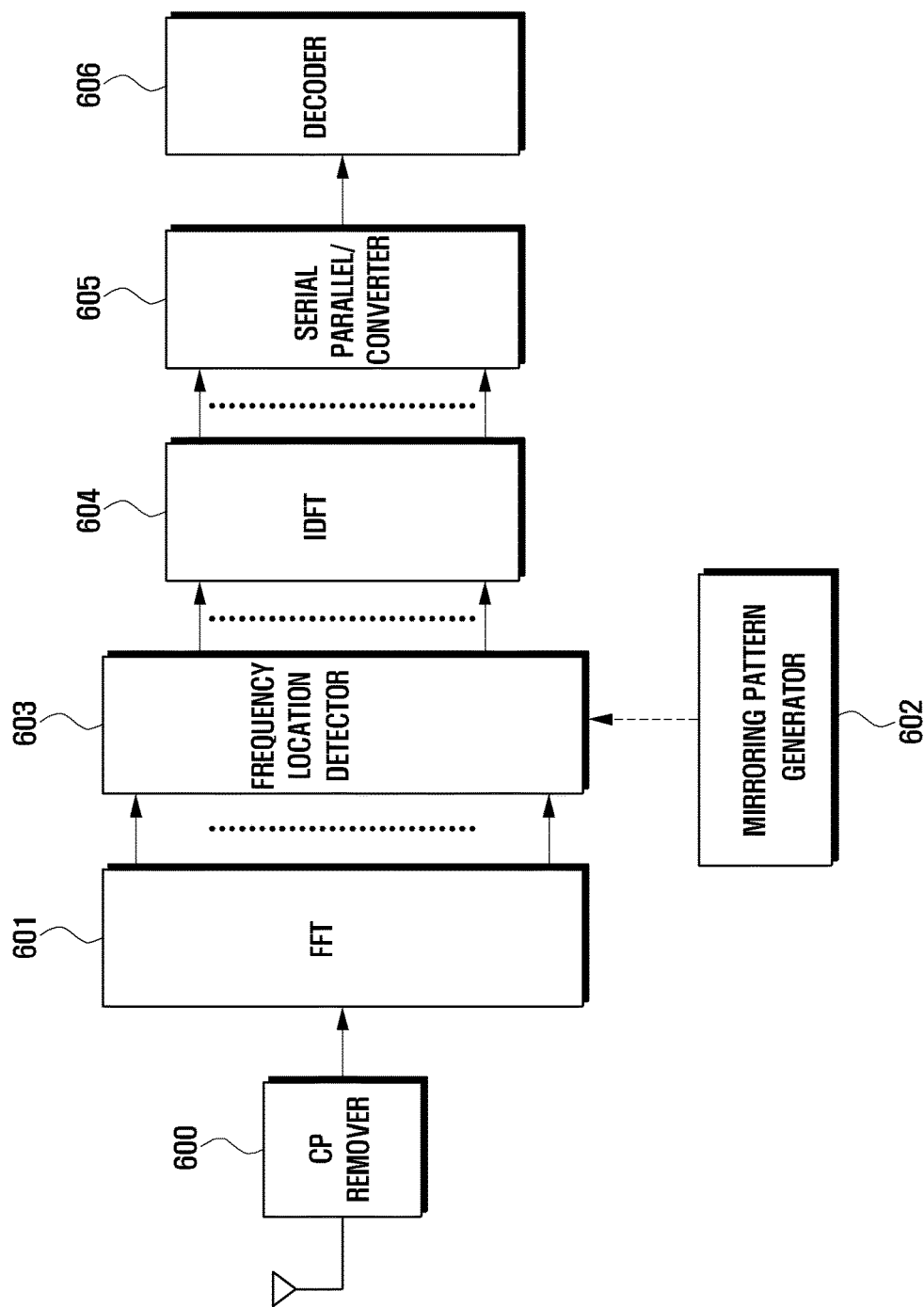
FIG. 6 is a block diagram illustrating a reception apparatus according to an embodiment of the present invention.

FIG. 6 is a block diagram illustrating a reception apparatus according to an embodiment of the present invention.

Referring to FIG. 6, the reception apparatus, e.g., a base station, includes a CP remover 600, a Fast Fourier Transformer (FFT) 601, a mirroring pattern generator 602, a frequency location detector 603, an inverse Discrete Fourier Transformer (IDFT) 604, a parallel/serial converter 605, and a decoder 606.

When an uplink signal is received at the reception apparatus, the CP remover 600 removes the CP from the received signal and outputs the CP-removed signal to the FFT 601.

The FFT 601 transforms the signal in a frequency domain and outputs the transformed signals to the frequency location detector 603.

The mirroring pattern generator 602 generates a mirroring pattern that is identical to the mirroring pattern generated at the mirroring pattern generator 503 of the transmitter and provides the mirroring pattern to the frequency location detector 603. The frequency location detector 603 detects the frequency locations of the respective users within the system bandwidth with reference to the mirroring pattern provided by the mirroring pattern generator 602.

The IDFT 604 transforms the signals transmitted by the respective users inversely in a time domain and outputs the inversely Fourier-transformed signals to the parallel/serial converter 605 in parallel. The parallel/serial converter 605 converts the parallel signals into serial serials. Finally, the decoder 606 decodes the signals output by the parallel/serial converter 605 in series to recover the transmitted data.

Figure 7:
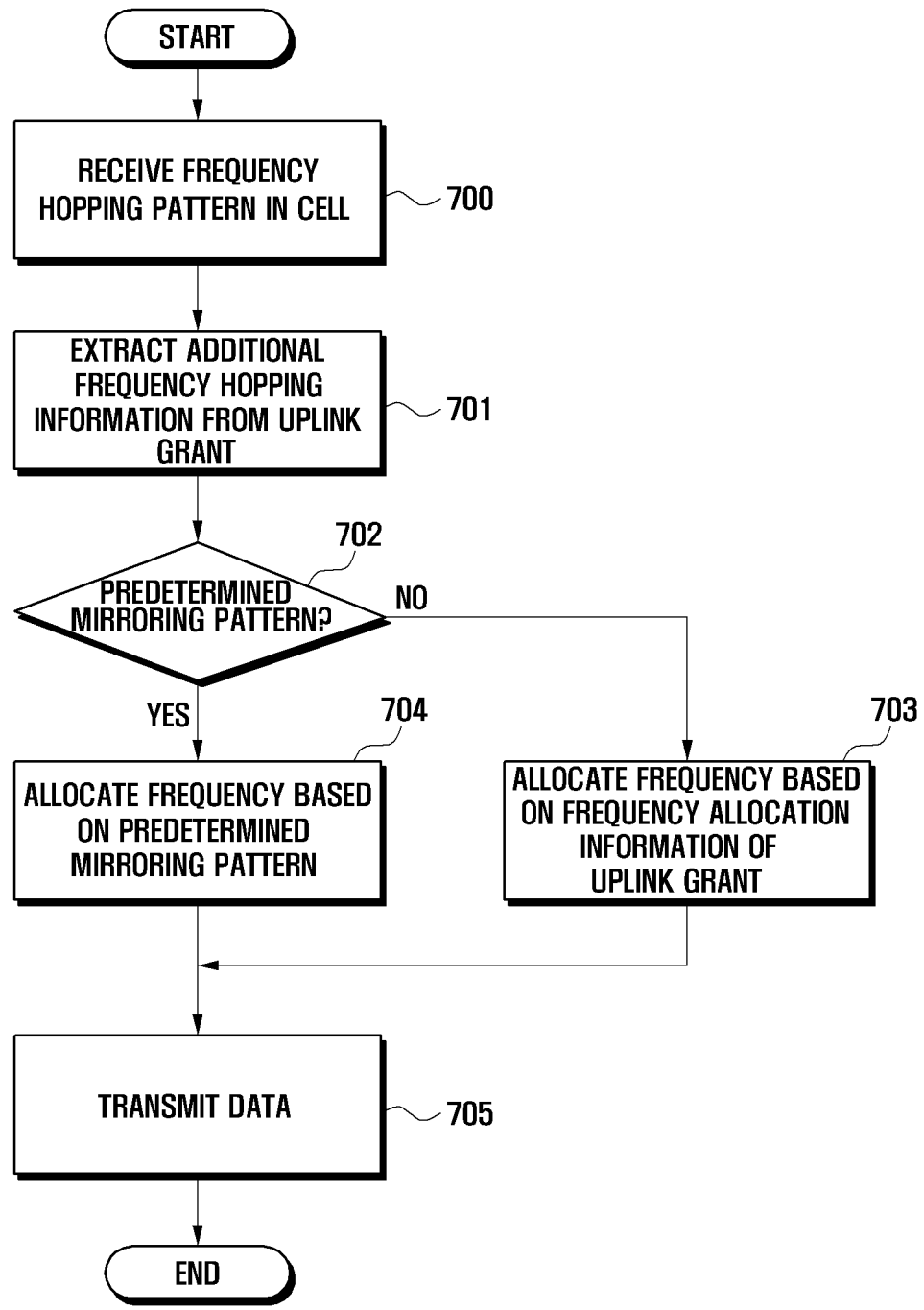
FIG. 7 is a flowchart illustrating a signal transmission method according to an embodiment of the present invention.

FIG. 7 is a flowchart illustrating a signal transmission method according to an embodiment of the present invention.

Referring to FIG. 7, a mobile terminal receives frequency hopping information broadcast by a base station within a cell in step 700. From the cell-specific frequency hopping information, the mobile terminal detects whether the frequency hopping is an intra-subframe frequency hopping or an inter-subframe frequency hopping. In step 701, the mobile terminal extracts user-specific frequency hopping information from an uplink grant transmitted by the base station and determines, based on the user-specific frequency hopping information, whether the user-specific frequency hopping follows a predetermined mirroring pattern in step 702. Here, the predetermined mirroring pattern is a mirroring pattern as described above with reference to FIG. 3 or 4. If the user-specific frequency hopping pattern does not follow the predetermined mirroring pattern, the mobile terminal performs the frequency hopping based on the frequency hopping information extracted from the uplink grant in step 703.

However, if the user-specific frequency hopping pattern follows the predetermined mirroring pattern, the mobile terminal performs the frequency hopping based on the mirroring pattern in step 704. In step 705, the mobile terminal transmits data through the frequency band allocated at step 703 or 704.

Figure 8:
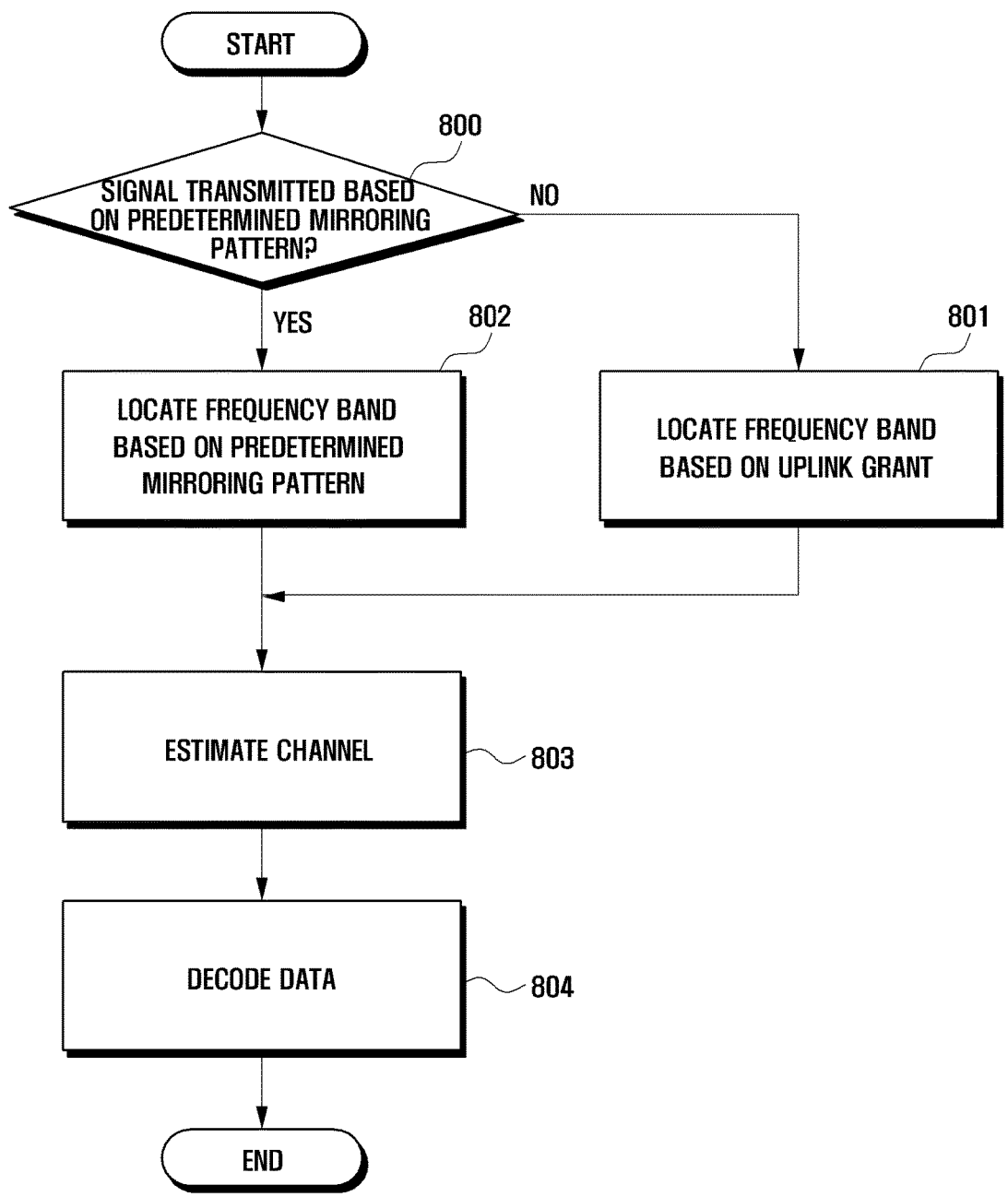
FIG. 8 is a flowchart illustrating a signal reception method according to an embodiment of the present invention.

FIG. 8 is a flowchart illustrating a signal reception method according to an embodiment of the present invention.

Referring to FIG. 8, a base station determines whether a received signal from a mobile terminal is transmitted according to a mirroring pattern predefined between the base station and the mobile terminal in step 800. If the signal is not transmitted according to the predefined mirroring pattern, the base station locates the frequency band allocated to the mobile terminal for the data transmission based on the frequency allocation information of the uplink grant that is transmitted from the base station to the mobile terminal in step 801.

However, if the signal is transmitted according to the predefined mirroring pattern, the base station locates the frequency band allocated to the mobile terminal for the data transmission with reference to the predefined mirroring pattern in step 802. In step 803, the base station performs channel estimation to the data received through the frequency bands corresponding to respective mobile terminals detected at step 802 and then decodes the data transmitted by the respective mobile station using the estimated channel values in step 804.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

What is claimed is:

1. A method for receiving uplink data by a base station in a wireless communication system, the method comprising:
   transmitting first information on hopping, the first information on hopping indicating that one of inter-subframe hopping and intra-subframe hopping is configured;
   transmitting second information on hopping;
   determining whether mirroring is applied or not based on a packet transmission number, if the second information on hopping indicates that a predefined hopping pattern is enabled;
   identifying a resource for receiving the uplink data based on the determination as to whether the mirroring is applied or not; and
   receiving the uplink data using the identified resource.

2. The method of claim 1, wherein the second information on hopping is included in uplink grant information.

3. The method of claim 1, wherein the first information on hopping is cell-specific information.

4. A method for transmitting uplink data by a terminal in a wireless communication system, the method comprising:
   receiving first information on hopping,
   the first information on hopping indicating that one of inter-subframe hopping and intra-subframe hopping is configured;
   receiving second information on hopping;
   determining whether mirroring is applied or not based on a packet transmission number, if the second information on hopping indicates that a predefined hopping pattern is enabled;
   identifying a resource for transmitting the uplink data based on the determination as to whether the mirroring is applied or not; and
   transmitting the uplink data using the identified resource.

5. The method of claim 4, wherein the second information on hopping is included in uplink grant information.

6. The method of claim 4, wherein the first information on hopping is cell-specific information.

7. A base station for receiving uplink data in a wireless communication system, the base station comprising:
   a transceiver configured to transmit and receive signals to and from a terminal; and
   a controller configured to:
     control the transceiver to transmit first information on hopping, the first information on hopping indicating that one of inter-subframe hopping and intra-subframe hopping is configured,
     control the transceiver to transmit second information on hopping,
     determine whether mirroring is applied or not based on a packet transmission number, if the second information on hopping indicates that a predefined hopping pattern is enabled,
     identify a resource for receiving the uplink data based on the determination as to whether the mirroring is applied or not, and
     control the transceiver to receive the uplink data using the identified resource.

8. The base station of claim 7, wherein the second information on hopping is included in uplink grant information.

9. The base station of claim 7, wherein the first information on hopping is cell-specific information.

10. A terminal for transmitting uplink data in a wireless communication system, the terminal comprising:
    a transceiver configured to transmit and receive signals to and from a base station; and
    a controller configured to:
      control the transceiver to receive first information on hopping, the first information on hopping indicating that one of inter-subframe hopping and intra-subframe hopping is configured,
      control the transceiver to receive second information on hopping,
      determine whether mirroring is applied or not based on a packet transmission number, if the second information on hopping indicates that a predefined hopping pattern is enabled,
      identify a resource for transmitting the uplink data based on the determination as to whether the mirroring is applied or not, and
      control the transceiver to transmit the uplink data using the identified resource.

11. The terminal of claim 10, wherein the second information on hopping is included in uplink grant information.

12. The terminal of claim 10, wherein the first information on hopping is cell-specific information.

* * * * *